(12) United States Patent
Kim et al.

(10) Patent No.: US 12,232,099 B2
(45) Date of Patent: Feb. 18, 2025

(54) METHOD FOR TERMINAL TO PERFORM BEAM MANAGEMENT OPERATION IN WIRELESS COMMUNICATION SYSTEM SUPPORTING SIDELINK, AND DEVICE FOR SAME

(71) Applicant: LG ELECTRONICS INC., Seoul (KR)

(72) Inventors: Heejin Kim, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 17/765,622

(22) PCT Filed: Oct. 28, 2020

(86) PCT No.: PCT/KR2020/014797
§ 371 (c)(1),
(2) Date: Mar. 31, 2022

(87) PCT Pub. No.: WO2021/086004
PCT Pub. Date: May 6, 2021

(65) Prior Publication Data
US 2022/0394697 A1  Dec. 8, 2022

(30) Foreign Application Priority Data

Oct. 30, 2019 (KR) .................. 10-2019-0136149

(51) Int. Cl.
*H04W 72/044* (2023.01)
*H04W 72/20* (2023.01)
*H04W 72/54* (2023.01)

(52) U.S. Cl.
CPC ......... *H04W 72/046* (2013.01); *H04W 72/20* (2023.01); *H04W 72/54* (2023.01)

(58) Field of Classification Search
CPC .................. H04W 72/54; H04W 72/20; H04W 72/046; H04W 56/00; H04W 4/46; H04W 72/40;
(Continued)

(56) References Cited

U.S. PATENT DOCUMENTS

| 2019/0052344 A1 | 2/2019 | Kundargi et al. |
| 2019/0191427 A1 | 6/2019 | Wang et al. |

(Continued)

FOREIGN PATENT DOCUMENTS

| KR | 10-2018-0108150 | 10/2018 |
| WO | 2019-160973 | 8/2019 |

OTHER PUBLICATIONS

PCT International Application No. PCT/KR2020/014797, International Search Report dated Feb. 9, 2021, 3 pages.
(Continued)

*Primary Examiner* — Chi Ho A Lee
(74) *Attorney, Agent, or Firm* — LEE, HONG, DEGERMAN, KANG & WAIMEY

(57) ABSTRACT

Disclosed are a method and device for a terminal to perform a beam management operation in a wireless communication system supporting sidelink according to various embodiments. Disclosed are a method and a device for same, the method comprising the steps of: acquiring, from a second terminal, a measurement value indicating the quality of a beam pair in which a sidelink signal is transmitted and received; and determining whether to perform a beam management operation for the beam pair on the basis of one or more thresholds and the measurement value, wherein each of the one or more thresholds may be set on the basis of at least one among mobility information about the first terminal, the relative speed of the first terminal with respect to the second terminal, the congestion level of a channel, and service characteristics related to the sidelink signal.

12 Claims, 18 Drawing Sheets

(58) Field of Classification Search
CPC .... H04B 7/088; H04B 17/318; H04B 7/0695; H04B 17/336
See application file for complete search history.

(56) References Cited

U.S. PATENT DOCUMENTS

| | | | |
|---|---|---|---|
| 2020/0145855 A1* | 5/2020 | Hahn | H04W 24/08 |
| 2020/0359445 A1* | 11/2020 | Wu | H04L 5/0051 |
| 2020/0395993 A1* | 12/2020 | Ryu | H04W 76/23 |
| 2021/0013954 A1* | 1/2021 | Zhao | H04L 5/0023 |
| 2021/0100059 A1* | 4/2021 | Xu | H04B 7/06954 |
| 2022/0007227 A1* | 1/2022 | Zhao | H04L 5/0037 |
| 2022/0045800 A1* | 2/2022 | Chen | H04L 1/1896 |
| 2022/0158708 A1* | 5/2022 | Zhang | H04W 72/569 |
| 2022/0224470 A1* | 7/2022 | Matsumura | H04B 7/0404 |
| 2022/0286234 A1* | 9/2022 | Zhao | H04W 28/24 |
| 2022/0303866 A1* | 9/2022 | Zhang | H04W 40/22 |

OTHER PUBLICATIONS

Huawei et al., "Beamforming for V2X sidelink for FR1 and FR2," R1-1903075, 3GPP TSG RAN WG1 Meeting #96, Mar. 2019, 6 pages.

\* cited by examiner (a)

(b)

(a)

(b)

METHOD FOR TERMINAL TO PERFORM BEAM MANAGEMENT OPERATION IN WIRELESS COMMUNICATION SYSTEM SUPPORTING SIDELINK, AND DEVICE FOR SAME

CROSS-REFERENCE TO RELATED APPLICATIONS

This application is the National Stage filing under 35 U.S.C. 371 of International Application No. PCT/KR2020/014797, filed on Oct. 28, 2020, which claims the benefit of earlier filing date and right of priority to Korean Application No. 10-2019-0136149, filed Oct. 30, 2019, the contents of which are all incorporated by reference herein in their entirety.

TECHNICAL FIELD

Embodiments of the present disclosure relate to a method for allowing a user equipment (UE) to perform a beam management operation based on a beam quality in a wireless communication system supporting sidelink, and a device for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between UEs without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and a device for allowing a threshold value, which is a trigger condition of a beam management operation, to be determined differently according to a channel environment in sidelink and/or V2X communication, so that frequent change in beam pairing is prevented from being triggered in the sidelink and/or V2X communication environment, and a time required for beam search is shortened, thereby implementing fast beam pairing between UEs.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with one aspect of the present disclosure, a method for performing a beam management operation by a first user equipment (UE) in a wireless communication system supporting sidelink may include obtaining, from a second user equipment (UE), a measurement value for a quality of a beam pair through which a sidelink signal is transmitted and received; and determining whether to perform a beam management operation for the beam pair based on at least one threshold value and the measurement value, wherein each of the at least one threshold value is set based on at least one of mobility information of the first UE, a relative speed to the second UE, a congestion level of a channel, and service characteristics related to the sidelink signal.

The beam management operation may be performed based on the measurement value less than the at least one threshold value. The beam management operation may include a first beam management operation in which beam sweeping is performed in a limited range based on a beam direction of the beam pair, and a second beam management operation in which the beam sweeping is performed regardless of the beam direction of the beam pair.

The first UE may trigger a reselection operation of transmission resources related to the sidelink based on a determination of performing the beam management operation.

The at least one threshold value may include a first threshold value and a second threshold value. The first UE may perform the first beam management operation when the measurement value is equal to or greater than the first threshold value and less than the second threshold value, and may perform the second beam management operation when the measurement value is less than the first threshold value.

The method may further include providing, to the second UE, operation information on the beam management operation to be performed.

The operation information may be provided to the second UE through a format of sidelink control information (SCI) or a format of downlink control information (DCI).

The beam management operation may be performed based on the measured value less than the at least one threshold value. The beam management operation may include a third beam management operation for repeatedly transmitting a transmission beam in the same direction, and a fourth beam management operation for transmitting a transmission beam in a plurality of directions.

The at least one threshold value may include a second threshold value and a third threshold value, and the first UE may perform the third beam management operation when the measurement value is equal to or greater than the second threshold value and less than the third threshold value, and performs the fourth beam management operation when the measurement value is less than the second threshold value.

The first UE may provide information on the beam management operation to be performed to the second UE through an indicator indicating whether the transmission beam is repeatedly transmitted.

The at least one first candidate beam used in the first beam management operation may have a beam width smaller than a width of at least one second candidate beam used in the second beam management operation. The number of the at least one first candidate beam used in the first beam management operation may be smaller than the number of the at least one second candidate beams. The at least one first candidate beam may include at least one beam having a value less than an angular spread value of the at least one second candidate beam.

The measurement value may be at least one of a reference signal received quality (RSRQ), a signal to interference plus noise ratio (SINR), a signal-to-noise ratio (SNR), and a reference signal received power (RSRP).

In accordance with another aspect of the present disclosure, a method for performing a beam management operation by a second user equipment (UE) in a wireless communication system supporting sidelink may include measuring a quality of a beam pair through which a sidelink signal is transmitted and received; reporting a measurement value of the measured beam pair quality to a first user equipment (UE); and obtaining, from a first user equipment (UE), information on a beam management operation for the beam pair determined based on the measurement value and at least one threshold value, wherein each of the at least one threshold value is set based on at least one of mobility information of the first UE, a relative speed to the second UE, a congestion level of a channel, and service characteristics related to the sidelink signal.

In accordance with another aspect of the present disclosure, a first user equipment (UE) for performing a beam management operation in a wireless communication system supporting sidelink may include a radio frequency (RF) transceiver; and a processor connected to the RF transceiver. The processor may obtain, from a second user equipment (UE), a measurement value for a quality of a beam pair through which a sidelink signal is transmitted and received, under control of the RF transceiver, and may determine whether to perform a beam management operation for the beam pair based on at least one threshold value and the measurement value, wherein each of the at least one threshold value is set based on at least one of mobility information of the first UE, a relative speed to the second UE, a congestion level of a channel, and service characteristics related to the sidelink signal.

In accordance with another aspect of the present disclosure, a chip set for performing a beam management operation in a wireless communication system supporting sidelink may include at least one processor, and at least one memory operatively connected to the at least one processor, and configured to store instructions such that the at least one processor performs specific operations by executing the instructions. The specific operations may include obtaining, from a second user equipment (UE), a measurement value for a quality of a beam pair through which a sidelink signal is transmitted and received, and determining whether to perform a beam management operation for the beam pair based on at least one threshold value and the measurement value, wherein each of the at least one threshold value is set based on at least one of mobility information of the first UE, a relative speed to the second UE, a congestion level of a channel, and service characteristics related to the sidelink signal.

The processor may control a driving mode of a device connected to the chip set, based on the measurement value.

In accordance with another aspect of the present disclosure, a computer-readable storage medium configured to store at least one computer program including instructions such that at least one processor for use in a wireless communication system supporting sidelink performs specific operations of performing a beam management operation by executing the instructions, the computer-readable storage medium may include at least one computer program for allowing the at least one processor to perform a beam management operation, and a computer-readable storage medium configured to store the at least one computer program, wherein the specific operations include: obtaining, from a second user equipment (UE), a measurement value for a quality of a beam pair through which a sidelink signal is transmitted and received, and determining whether to perform a beam management operation for the beam pair based on at least one threshold value and the measurement value, wherein each of the at least one threshold value is set based on at least one of mobility information of the first UE, a relative speed to the second UE, a congestion level of a channel, and service characteristics related to the sidelink signal.

Advantageous Effects

Various embodiments of the present disclosure can allow a method and a device for allowing a threshold value, which is a trigger condition of a beam management operation, to be determined differently according to a channel environment in sidelink and/or V2X communication, so that a frequent change in beam pairing is prevented from being triggered in the sidelink and/or V2X communication environment, and a time required for beam search is shortened, thereby implementing fast beam pairing between UEs.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
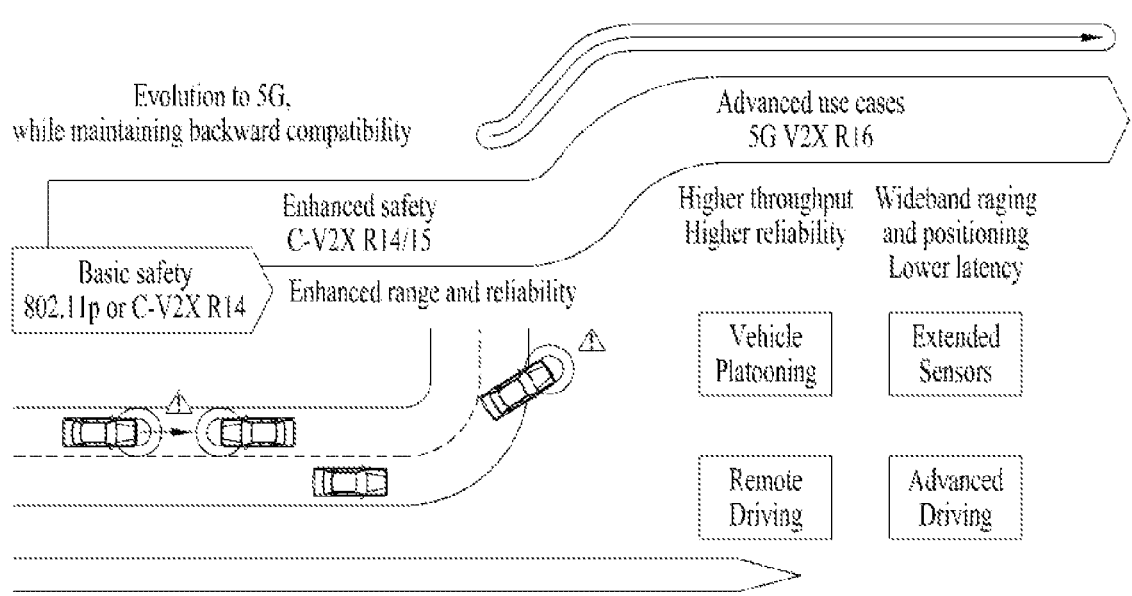
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
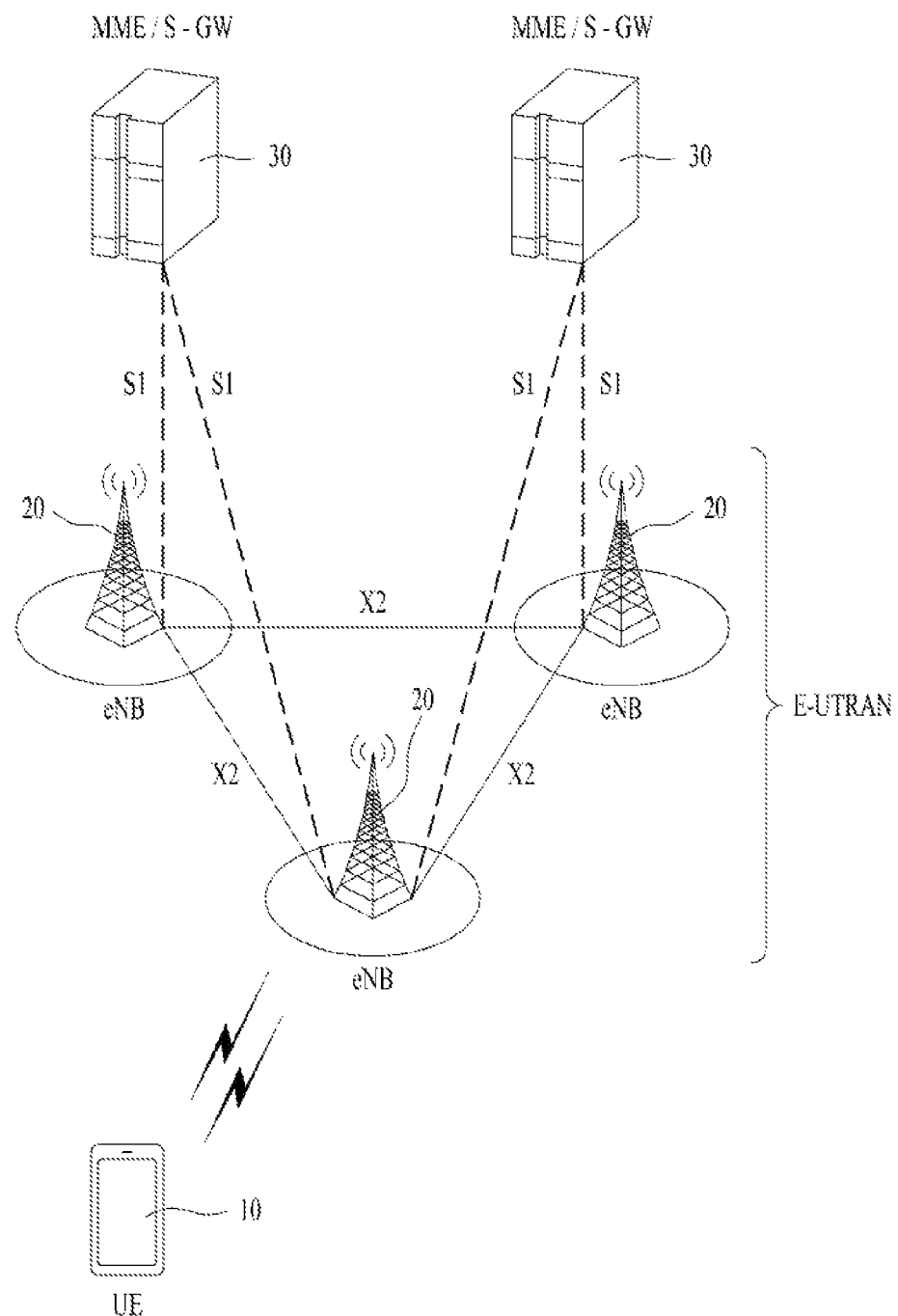
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user UE (UT), subscriber station (SS), mobile UE (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
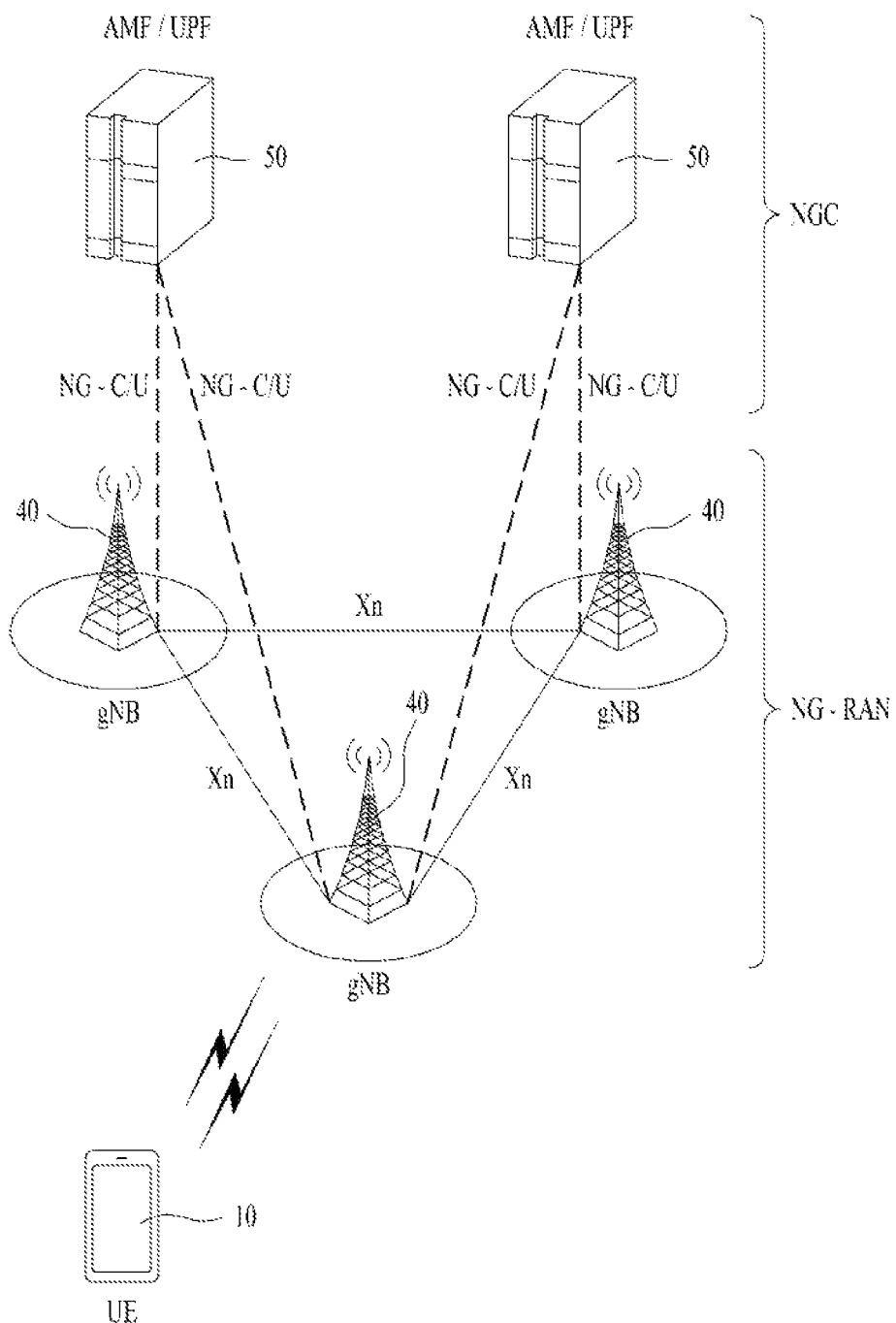
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
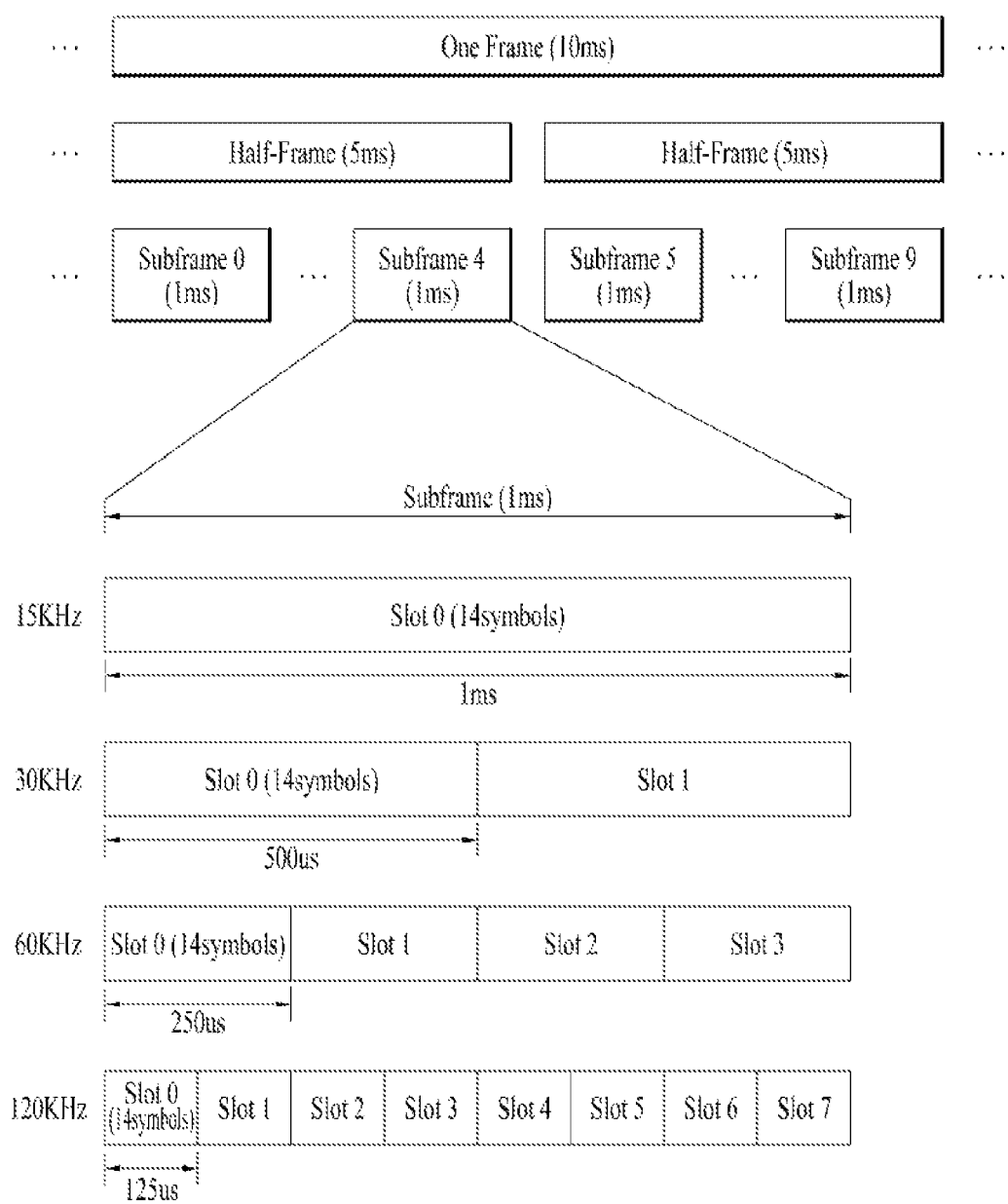
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration $\mu$ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
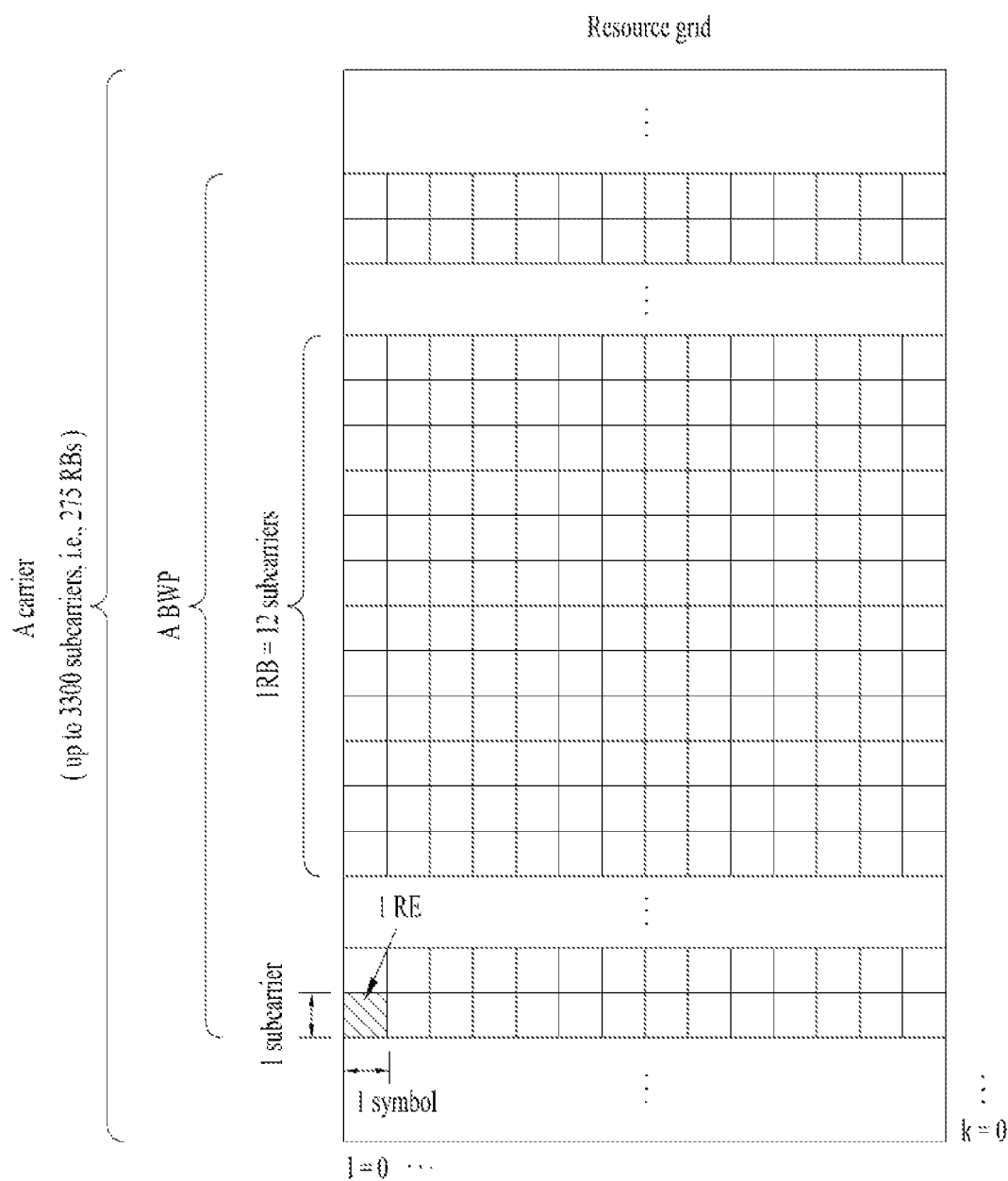
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
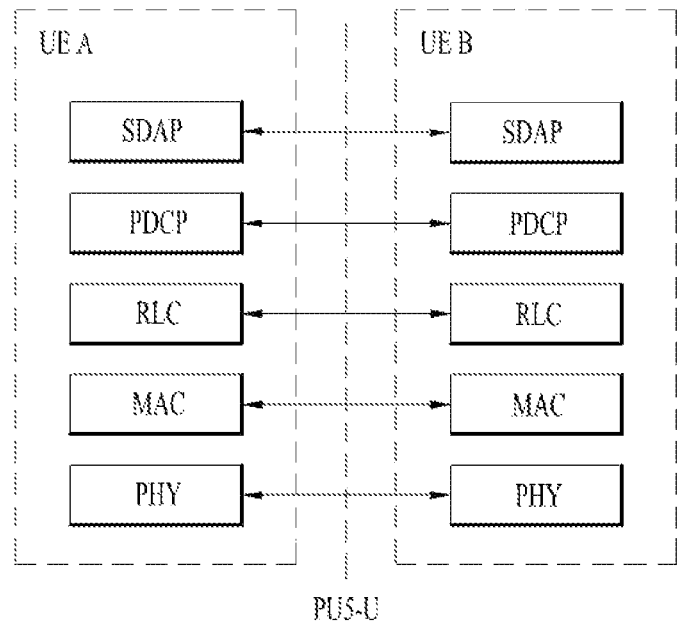
FIG. 6 illustrates a radio protocol architecture for SL communication.
Figure 6:
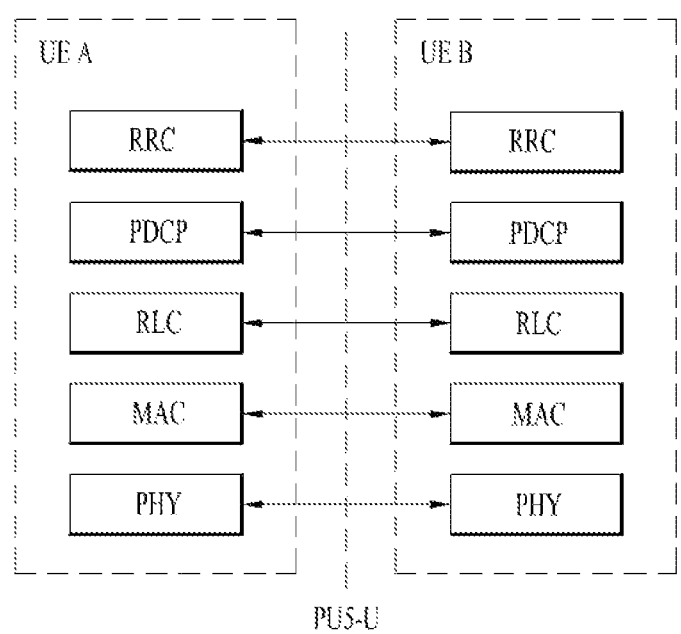

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
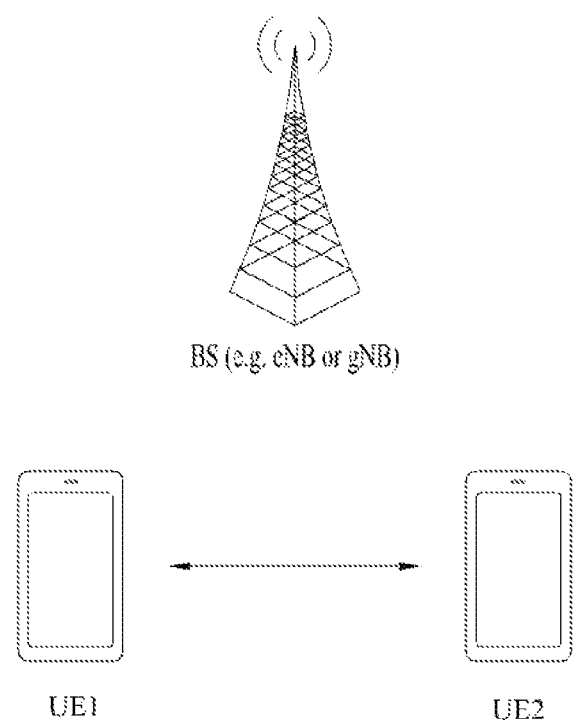
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
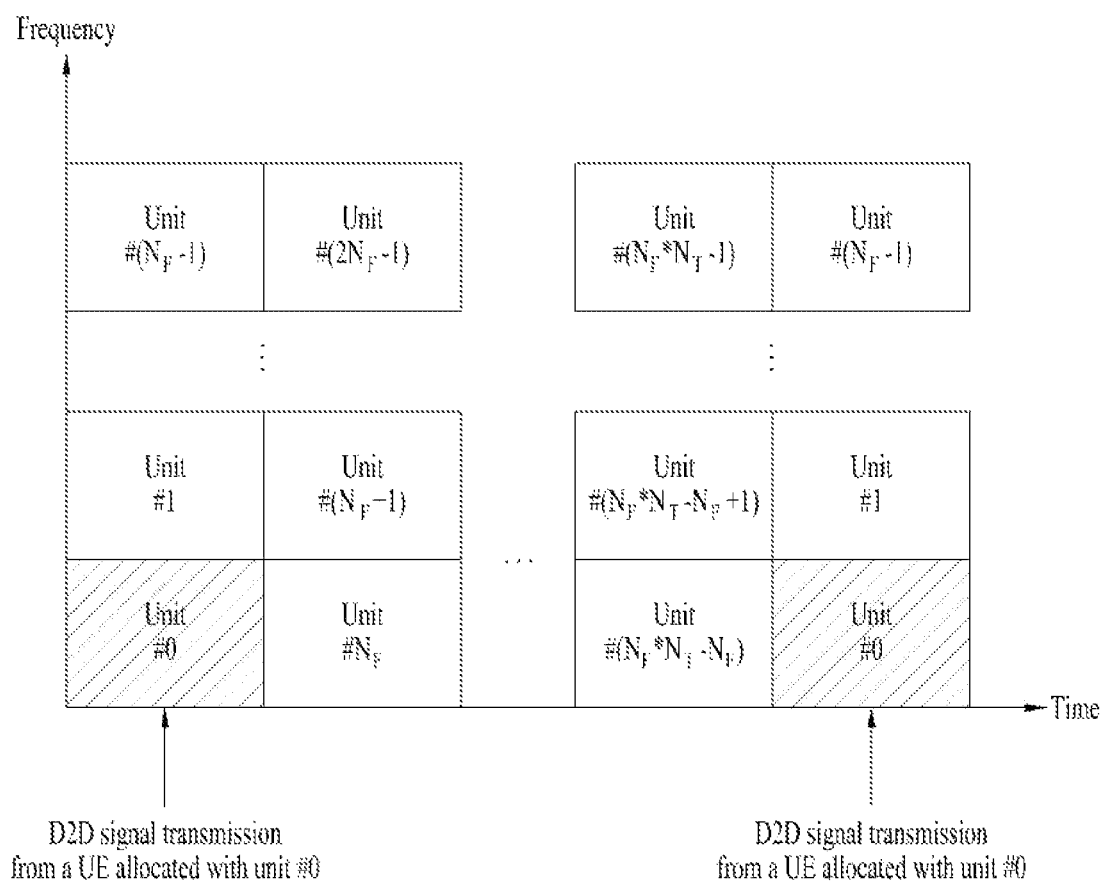
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
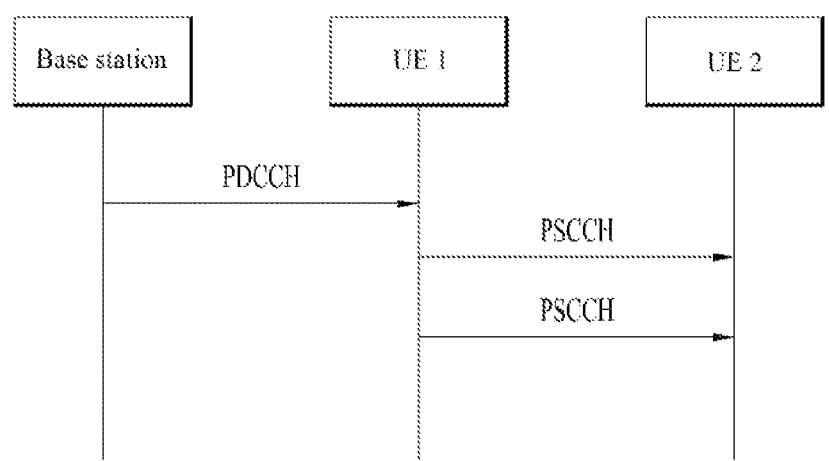
FIG. 9 illustrates a procedure in which UEs perform V2X or SL communication according to a transmission mode.
Figure 9:
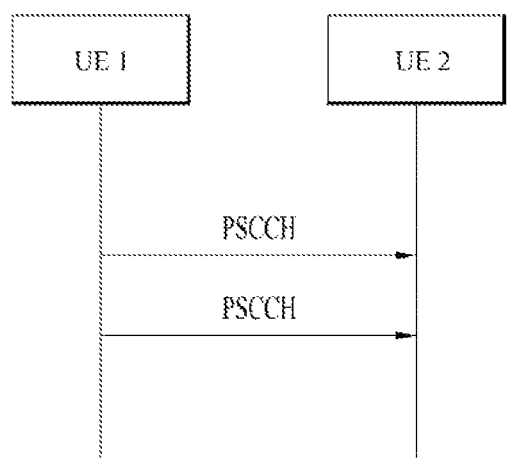

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Event-Triggered Beam Pair Management Based on Measurement

In NR V2X, vehicle communication in the mmWave frequency band as well as the 5.9 GHz ITS band may be considered. When an analog (or digital) beam is used for vehicle communication in a millimeter wave (mmW) band, a UE-to-UE (or UE-to-BS) transmission/reception (Tx/Rx) beam pairing operation is required. When the number of transmit/receive (Tx/Rx) beams used by a transmission end and a reception end is plural, the quality of radio frequency (RF) channels generated by a combination of a candidate transmit (Tx) beam and a candidate receive (Rx) beam may be measured, and an excellent transmit/receive (Tx/Rx) beam pair can be selected as an appropriate Tx/Rx beam pair on the basis of the measured channel quality information. However, searching for the appropriate beam pair according to the above-described scheme may require a lot of time, and calculation complexity can greatly increase at the reception end.

In particular, it may be difficult to maintain an appropriate beam pair that was discovered for a long period of time by the above-described method in a situation in which a channel is rapidly changed in a high-speed moving environment. In this situation, the reception end may need to perform a process for finding an appropriate beam pair more frequently. In addition, the beam used in a high frequency band has a narrow width as compared to a low frequency band so that when the transmission (Tx) beam and the reception (Rx) beam are misaligned (i.e., when an appropriate beam pair is not maintained), the RF channel quality may rapidly deteriorate. In such a situation, when the change or replacement of the beam pair is performed by a specific scheme in which the gNB (or a neighboring UE) determines the beam pair based on channel quality information for each beam reported (or transmitted) by the UE and transmits information on the determined beam pair to the UE, a lot of time can be required for the change or replacement of the beam pair. Therefore, the change or replacement of the beam pair according to the above-described method may be inappropriate for a high-speed moving environment.

Therefore, for UE-to-UE transmit/receive (Tx/Rx) beam pair determination, it is necessary to determine whether a current beam pair (unstable beam pair or quality degraded beam pair) between UEs should be maintained, it is necessary to determine whether reselection of a current beam pair is required (between UEs), and whether reselection of the beam pair is required (when reselection of the beam pair is performed). In this case, a criterion to which one of Tx beam, Rx beam, and Tx-Rx beams will be used for beam scanning/measurement & beam reporting/selection operation may be required. In addition, a beam management method capable of changing an appropriate beam pair according to a channel situation while reducing a time required for finding a beam pair may be necessary. Hereinafter, as a beam management method according to the above-described method, an event-triggered transmit/receive (Tx/Rx) beam management method based on channels measured by UEs and/or per-beam measurement values measured by UEs is proposed.

Although the following description discloses that the beam management-related operations/states are classified into beam sweeping/(re)selection, current beam pair maintenance, and/or beam failure for convenience of description, a combination of some of the classified operations can also be an operation related to beam management. Here, beam sweeping/(re)selection may include coarse beam sweeping/(re)selection for a Tx beam, fine beam sweeping/(re)selection for a Tx beam, coarse beam sweeping/(re)selection operation for an Rx beam, and/or fine beam sweeping/(re) selection operation. In addition, the operation of beam sweeping/(re)selection may also be divided into two-step (i.e., coarse beam and fine beam) or more (or less) depending on the beam width of a candidate beam (or a selected beam) and/or the number of candidate beams.

Further, the two-step may include a first step in which coarse beam search/selection is performed, and a second step in which fine beam search/selection is performed. The above-described situation may refer to a first item (1) in which the beam width of a candidate beam (or a selected beam) of the first step is wider than the beam width of a candidate beam (or a selected beam) of the second step, may refer to a second item (2) in which a spacing (angle) between candidate beams of the first step is larger than a spacing between candidate beams of the second step, may refer to a third item (3) in which the number of candidate beams (selected beams) of the first step is larger than the number of candidate beams (or selected beams) of the second step, and may refer to a fourth item (4) indicating a combination of some/all of the above-described items (1)~(3).

Figure 10:
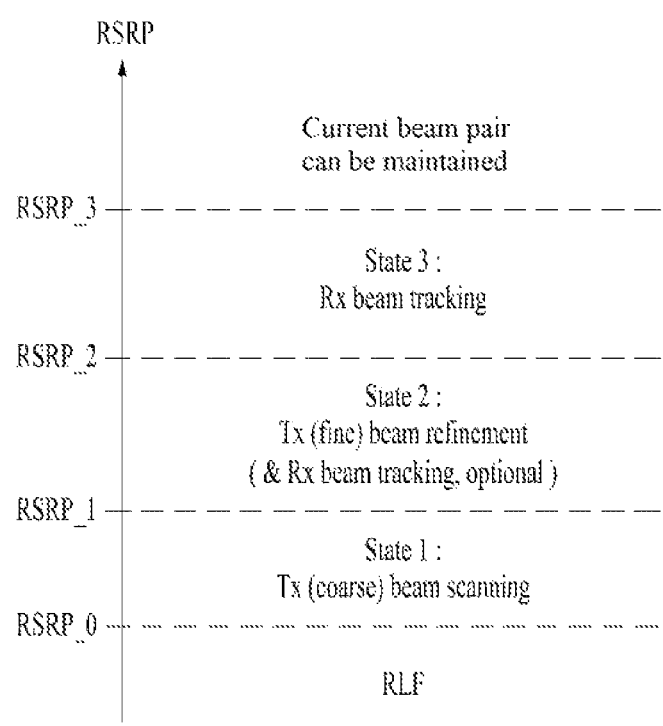
FIG. 10 is a diagram illustrating a mapping relationship between at least one threshold value and a beam management operation by a UE.

FIG. 10 is a diagram illustrating a mapping relationship between at least one threshold value and a beam management operation by a UE.

In the method proposed above, as shown in FIG. 10, the UE can perform a beam management operation by determining the UE's beam management operation (e.g., coarse/fine-level beam search, beam failure, current beam pair maintenance, etc.) based on a threshold value for measurement parameters (for example, RSRP, SNR, SINR, RSRQ, and CQI).

When determining a beam management operation of the UE based on at least one threshold value for the above measurement parameters, a threshold value (e.g., values corresponding to RSRP_0~RSRP_3 shown in FIG. 10) corresponding to each operation (or for triggering of each operation) may be mapped.

The at least one threshold value (or the maximum/minimum value of the threshold value and/or the range of the threshold value) may be considered to be a problem of UE implementation, but may be set differently based on some/all of the following conditions. In addition, such a threshold value (or a maximum/minimum value and/or a range of a threshold value) may also be set for each carrier/BWP/resource pool.

Vehicle driving absolute/relative speed

Distance between transmitting and receiving UEs and/or (relative) driving direction Service type/requirements/priority (or service characteristics) (e.g., latency, reliability, required communication range)

Congestion level of transmission resource

Beam width of Tx beam/Rx beam/Tx-Rx beams (or an interval between candidate beams or the number of candidate beams)

In addition, not only the (maximum or minimum) number of symbols (or the number of CSI-RSs and the number of S-SSB resources) used for transmission of signals (measurement RS, for example, CSI RS, S-SSB) for beam management purposes, but also (periodic/aperiodic, maximum/minimum) transmission frequency of such signals may also be set differently based on some/all of the following items.

Vehicle driving absolute/relative speed

Distance between transmitting and receiving UEs and/or (relative) driving direction Service type/requirements/priority (e.g., latency, reliability, required communication range)

Congestion level of transmission resources

Beam width of Tx beam/Rx beam/Tx-Rx beams (or an interval between candidate beams or the number of candidate beams)

UE's received signal measurement/calculation value (range of values) (e.g., RSRP, SNR, SINR, RSRQ, etc.)

When the beam adjustment/reselection for the Tx beam and/or Rx beam is triggered (e.g., the beam/channel measurement value in FIG. 10 is a value between RSRP_0 to RSRP_3 or corresponds to one of states 1, 2, and 3), the adjustment and/or reselection of transmission resources can also be interpreted as being triggered. In other words, as part or all of the conditions for triggering adjustment/reselection of transmission resources, information indicating "when beam adjustment/reselection is triggered for Tx beams and/or Rx beams" may be included. Here, the above case where the beam adjustment/reselection for the Tx beam and/or Rx beam is triggered may correspond to a case in which the beam measurement result (e.g., RSRP/SINR/SNR/RSRQ, etc.) is less than or equal to a threshold value configured between UEs (or is set or signaled by the BS and/or the network). In addition, selection of transmission/reception (Tx/Rx) beams and selection of transmission resources may be performed at the same time, or may be performed sequentially (e.g., selecting transmission/reception beams and selecting an actual transmission resource from among transmission resources available as the selected beam).

Meanwhile, as described above, depending on which one of the Tx UE and the Rx UE performs beam sweeping, and depending on which beam will be changed according to execution of beam (re)selection, the beam management operation can be classified into Tx beam sweeping/selection, Rx beam sweeping/selection, and/or Tx/Rx beam sweeping/selection. Hereinafter, a method for distinguishing between the Tx beam sweeping/selection operation and the Rx beam sweeping/selection operation, and signaling required for the above-described classification will be described.

Tx beam sweeping/selection and Rx beam sweeping/selection between UEs may be defined as different states, respectively (e.g., in FIG. 10, Tx/Rx beam sweeping/selection operations are defined as State 1 (or State 2) and State 3, respectively), and a state number (e.g., State 1→1, State 2→2) for triggering or agreement for the UE-to-UE beam management operation can be transmitted (or exchanged) together with a PSCCH or PSSCH. Alternatively, the state number may be associated with the format of the SCI (or DCI), and the UE may also expect a scheduled (or a determined) beam management operation based on the SCI (or DCI) format. For example, the indication of the state may be signaled in feedback information (e.g., CSI feedback) along with the measurement result to request that the receiving UE will perform operation of a specific state as a subsequent operation at the time of the measurement report, or may be indicated by the transmitting UE together with transmission resource information. Alternatively, the indication of the state may also be indicated by interworking with the SCI/DCI format.

Alternatively, from the viewpoint of the transmitting UE, two operations may be distinguished from each other by informing the counterpart UE of information about whether repeated transmission is performed using the same beam or by informing the counterpart UE of information about whether different transmission actions (Tx beam sweeping) are performed for cycling based on different beams, such that the above two operations can thus be distinguished from each other. In this case, information about whether repeated transmission is performed may be directly signaled by the transmitting UE that can directly signal information about whether repeated transmission is ON or OFF to the counterpart UE or can signal the ON/OFF state of repeated transmission using the 1-bit indicator. The signaling may be physical layer signaling (e.g., SCI/DCI) or may be higher layer signaling (e.g., RRC signaling). Alternatively, when the above-described repeated transmission is indicated, this means beam sweeping caused by the above State 3. When different transmission actions based on the above beam cycling are instructed, this means beam sweeping or beam management operation corresponding to the above state 1 and/or state 2.

However, even if the transmitting UE (or the receiving UE) instructs/recommends Rx beam sweeping and/or (re)selection to the receiving UE (or the transmitting UE), the receiving UE (or the transmitting UE) may prevent the corresponding operation instructed or recommended by the counterpart UE from being forcibly performed. That is, when Rx beam sweeping is instructed/recommended, the receiving UE (or the transmitting UE) can sweep different Rx beams and at the same time can perform measurement and Rx beam selection for the purpose of Rx beam tuning. In contrast, the receiving UE (or the transmitting UE) can receive the repeated measurement RSs while maintaining a single Rx beam, and can report a representative value (e.g., average/minimum/maximum values) of the measured RS signal strength to the counterpart UE (or the BS). In this case, the reported representative value may be reported as a measurement value. The above-described situation may be an implementation problem of the receiving UE, and may be an inevitable operation due to the limitation of the UE capability (or on-going session maintenance of the UE, for example, in terms of QoS satisfaction, requirement satisfaction, or link quality guarantee). For example, if there is only one beam that can be formed according to UE capability, or if there is no (suitable) candidate beam scheduled to perform sweeping because other beams are being used for other packet transmission (or other session Tx/Rx), the receiving UE has no choice but to perform the repeated measurement RS reception operation while maintaining a single Rx beam even if the Rx beam sweeping is instructed/recommended by the counterpart UE.

On the other hand, signaling (e.g., triggering and/or measurement reporting, indication/recommendation for a beam management operation selected based on measurement, and/or signaling for the purpose of confirming the indication/recommendation) required for the above beam management operations may be transmitted in the same frequency band/carrier/resource pool/BWP as the frequency band/carrier/resource pool/BWP, each of which is performing beam management, the scope or spirit of the present disclosure is not limited thereto, and it should be noted that such signaling can also be transmitted in different frequency bands/carriers/resource pools/BWPs. For example, the above-described signals (or signaling) for beam management in the a6 GHz (above 6 GHz) band may be transmitted through the b6 GHz (below 6 GHz) band. In particular, the signals may be included in SCI/DCI in the b6 GHz band, and may then be transmitted, or may be transmitted to a PSSCH along with data or may be transmitted to a PSSCH along with a discovery message. Alternatively, the signals (or signaling) for the above-described purpose may be transmitted either in a separate resource pool/BWP for beam management purposes in the a6 GHz band or in a resource pool/BWP in which a discovery message is transmitted.

Figure 11:
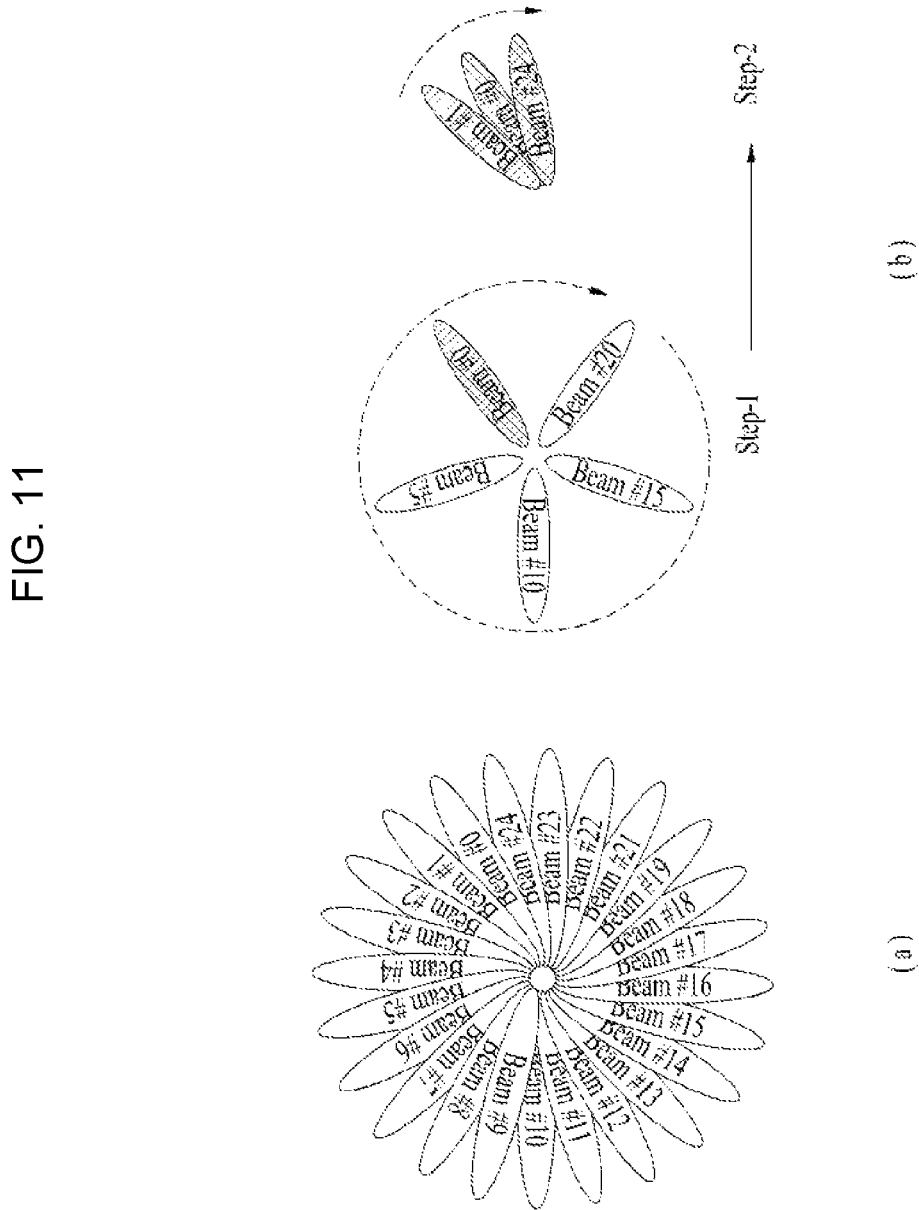
FIGS. 11 and 12 are diagrams illustrating a method in which two-stage beam sweeping or beam selection is performed.
Figure 12:
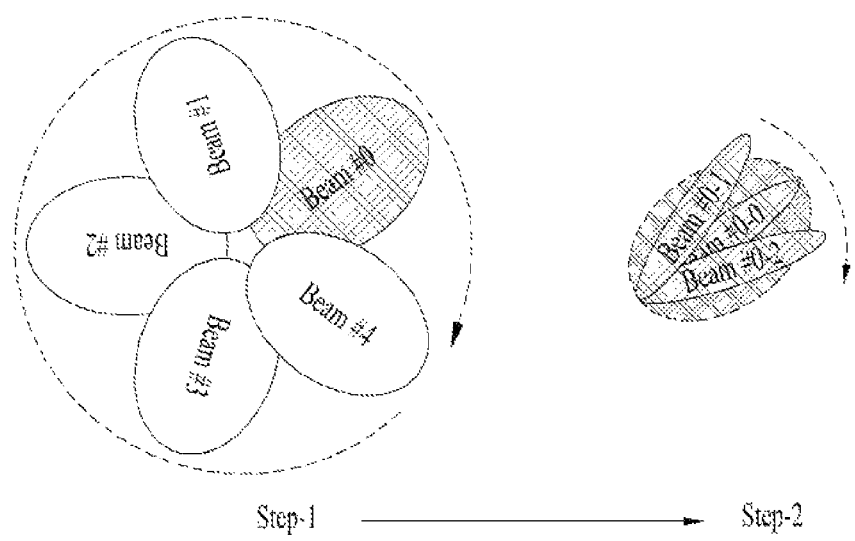

FIGS. 11 and 12 are diagrams illustrating a method in which two-stage beam sweeping or beam selection is performed.

Referring to FIGS. 11 and 12, the UE may perform 2-step beam sweeping/measurement and/or beam selection to reduce latency required for beam management.

Hereinafter, a general beam sweeping/measurement operation of the UE will be described without distinction between the Tx beam and the Rx beam. The following operation can be applied only to the Tx UE, can be applied only to the receiving UE, or can be applied both the Tx UE and the Rx UE. If necessary, the following description can also be applied between the BS and the UE, between the BSs, and/or between the UEs. In the 2-step beam sweeping/measurement operation described above, the first step and the second step may be operations that are distinguished from each other according to the following criteria.

According to one embodiment of the present disclosure, a beam width used for beam sweeping/measurement in the first step is the same as the beam width used for beam sweeping/measurement in the second step, a candidate beam for performing sweeping/measurement in the first step is more spatially distributed (widely, with a greater angular spread value) than a candidate beam for performing sweeping/measurement in the second step, and the number of candidate beams in the first step may be greater than the number of candidate beams in the second step. For example, in the first step, some beams that are evenly/unevenly distributed at 360 degrees in the horizontal domain (and/or 90 or 180 degrees in the vertical domain) among all candidate beams may be selected. In the second step, beam sweeping/measurement for candidate beam(s) arranged adjacent to one candidate beam (or a plurality of candidate beams) selected in the first step may be performed. Alternatively, the number of candidate beams considered in the first step may be set (or operated upon) to be equal to or greater than the number of candidate beams considered in the second step.

Referring to FIG. 11(a), beams related to beam sweeping/measurement may include 25 candidate beams. In this case, as shown in FIG. 11(b), beam sweeping/measurement in the first step may be performed for candidate beams distributed in a wider spatial area as compared to the second step. In the second step, candidate beams may be located (or disposed) in a narrower spatial area as compared to the first step, and beam sweeping/measurement may be performed centering around candidate beams (beams #0, #1, and #24 of FIG. 11B) adjacent to the candidate beam (beam #0 of FIG. 11B) selected as a preferred beam in the first step. In this case, the number of candidate beams for performing beam sweeping/measurement in the second step is less than or equal to the number of candidate beams in the first step and/or the number of all possible candidate beams (e.g., all possible beams that can be formed by the UE) in the first step. In addition, in the second step, the beam sweeping range can be limited by a predefined/signaled spatial relation (e.g., angular spread, etc.) based on the beam (beam #0 of FIG. 11B) selected in the first step. Here, the spatial relation information may be transmitted from a base station, a network, or a UE through physical layer signaling or higher layer signaling.

Alternatively, the beam width used for beam sweeping/measurement in the first step may be different from the beam width used for beam sweeping/measurement in the second step. Specifically, the beam width of the candidate beam in the first step may be larger than the beam width of the candidate beam in the second step. In addition, the candidate beams for sweeping/measurement in the first step are more spatially distributed (broadly, for example, with a larger angular spread value) than the candidate beams for sweeping/measurement in the second step. Alternatively, the number of candidate beams used in the first step may be greater than the number of candidate beams used in the second step.

For example, referring to FIG. 12, in the first step, the UE may perform beam sweeping/measurement on candidate beams (and/or candidate beams having a wider beam width) distributed over a wider spatial area than in the second step. In the second step, candidate beams may be located (or disposed) in a narrower spatial area as compared to the first step, and beam sweeping/measurement may be performed centering around candidate beams (beams #0-0, #0-1, and #0-2 of FIG. 12) adjacent to the candidate beam (beam #0 of FIG. 12) selected as a preferred beam in the first step. In this case, the number of candidate beams for performing beam sweeping/measurement in the second step is less than or equal to the number of candidate beams in the first step and/or the number of all possible candidate beams (e.g., all possible beams that can be formed by the UE) in the first step. In addition, in the second step, the beam sweeping range can be limited by a predefined/signaled spatial relation (e.g., angular spread, etc.) based on the beam (beam #0 of FIG. 12) selected in the first step. Meanwhile, the number of resources of the maximum configurable beam measurement signal (e.g., CSI-RS, S-SSB) may be determined differently according to the beam widths. Specifically, when the beam width is large, the maximum number of resources of the configurable beam measurement signal may be set to be equal to or greater than that of the case having a relatively small beam width.

On the other hand, when the beam width of the candidate beam in the first step is different from the beam width of the candidate beam in the second step (e.g., beam #X(s) of the first step and beam #Y(s) of the second step), beam management information (e.g., information on beam #X) obtained based on the beam width for only one from among the candidate beam of the first step and the candidate beam of the second step may be utilized as assist information in the process of determining another candidate beam (e.g., beam #Y) having a different beam width, or may be utilized to determine the set (e.g., beam #Y(s)) of candidate beams of other candidate beams having other beam widths. Specifically, the above-described utilization of the assist information in the process of determining other candidate beams having different beam widths may include selecting only one beam #Y having the following four features (1), (2), (3), and (4), may include selecting only one or some of at least two candidate beams (beam #Y) satisfying the above-described condition, or may include determining the set of beam #Y candidates (or the set of beam #Y candidates is used as assist information in such determination). In the first feature (1), a beam including (or guided in) the absolute direction of the beam selected in the beams #X may be selected. In the second feature (2), a beam having the highest beam gain in the beam direction selected in the beam #X may be selected. In the third feature (3), a beam formed to overlap all/some of the beam #X may be selected. In the fourth feature (4), one beam having the largest spatial overlap portion related to beam #X (or one beam having an overlap ratio of more than a specific threshold value) may be selected.

Alternatively, the above-described beams having different beam widths (e.g., beam #X, beam #Y) may refer to beams used for transmission and reception through different channels/data packets/Tx resources (e.g., carriers, resource pool, BWP, etc.), and may also refer to beams used for transmission and reception of signals transmitted in different frequency bands. As an example, one of beam #X and beam #Y may be used for transmission and reception of PSCCH, and the other one may be used for transmission and reception of a PSSCH. Alternatively, one of beam #X and beam #Y may be used for transmission and reception of SCI and/or SA, and the other one may be used for transmission and reception of data. Alternatively, one of beam #X and beam #Y may be used for transmission and reception of a discovery channel, and the other one may be used for transmission and reception of a control channel and/or a data channel. Alternatively, beam #X may be transmitted in a lower band than beam #Y. For example, beam #X may be a beam formed for signal transmission/reception in a 28 GHz band and/or a 5.9 GHz band, and beam #Y may be a beam formed for signal transmission/reception in a 63 GHz band. Here, the beam width of beam #X may be larger/wider than that of beam #Y.

Alternatively, as described above, an indicator (e.g., 1-bit indicator) for determining whether a UE-to-UE (or UE-to-BS) beam management operation is in a first step of beam management (e.g., coarse level beam sweeping/measurement/selection) or is in a state (e.g., state 1 of FIG. 10) mapped to the first step may be required, and an indicator (e.g., 1-bit indicator) for determining whether a UE-to-UE (or UE-to-BS) beam management operation is in a second step of beam management (for beam sweeping/measurement/selection considering the beam (with high spatial correlation) selected in the first step and adjacent candidate beams) or is in a state (e.g., state 2 or state 3) mapped to the second step of the beam management may be required. Here, the indicator can be transmitted through physical layer signaling or higher layer signaling.

Hereinafter, the above-described indicator will be described in detail, but this indicator may also be similarly utilized/applied in a UE having a distributed antenna. In this case, the above indicator may be used as an indicator for determining whether beam sweeping/measurement/selection for the panel/beam-group/(logical/physical) antenna port group is performed, or may also be used as an indicator for determining whether sweeping/measurement/selection for all/some candidate beams capable of being formed in the selected panel/beam-group/(logical/physical) antenna port group is performed. In this case, an indicator for determining whether a UE is a UE having a co-located antenna or is a UE having a distributed antenna may be separately defined. When the same indicator is applied/used in the UE having the co-located antenna and the other UE having the distributed antenna through the separately defined indicators, UE-to-UE confusion can be prevented from occurring. Here, the separately defined indicator may be transmitted through physical layer signaling or higher layer signaling. In particular, the above-described separately defined indicator may be transmitted along with the indicator for determining definition of the first step of beam management (e.g., coarse level beam sweeping/measurement/selection) or definition of a state mapped to the first step of beam management, or may be transmitted along with the indicator for determining definition of the second step of beam management (e.g., beam sweeping/measurement/selection considering a beam selected in the first step (with a high spatial correlation) and adjacent candidate beams) or definition of a state (e.g., state 2 or state 3 of FIG. 10) mapped to the second step of beam management.

Figure 13:
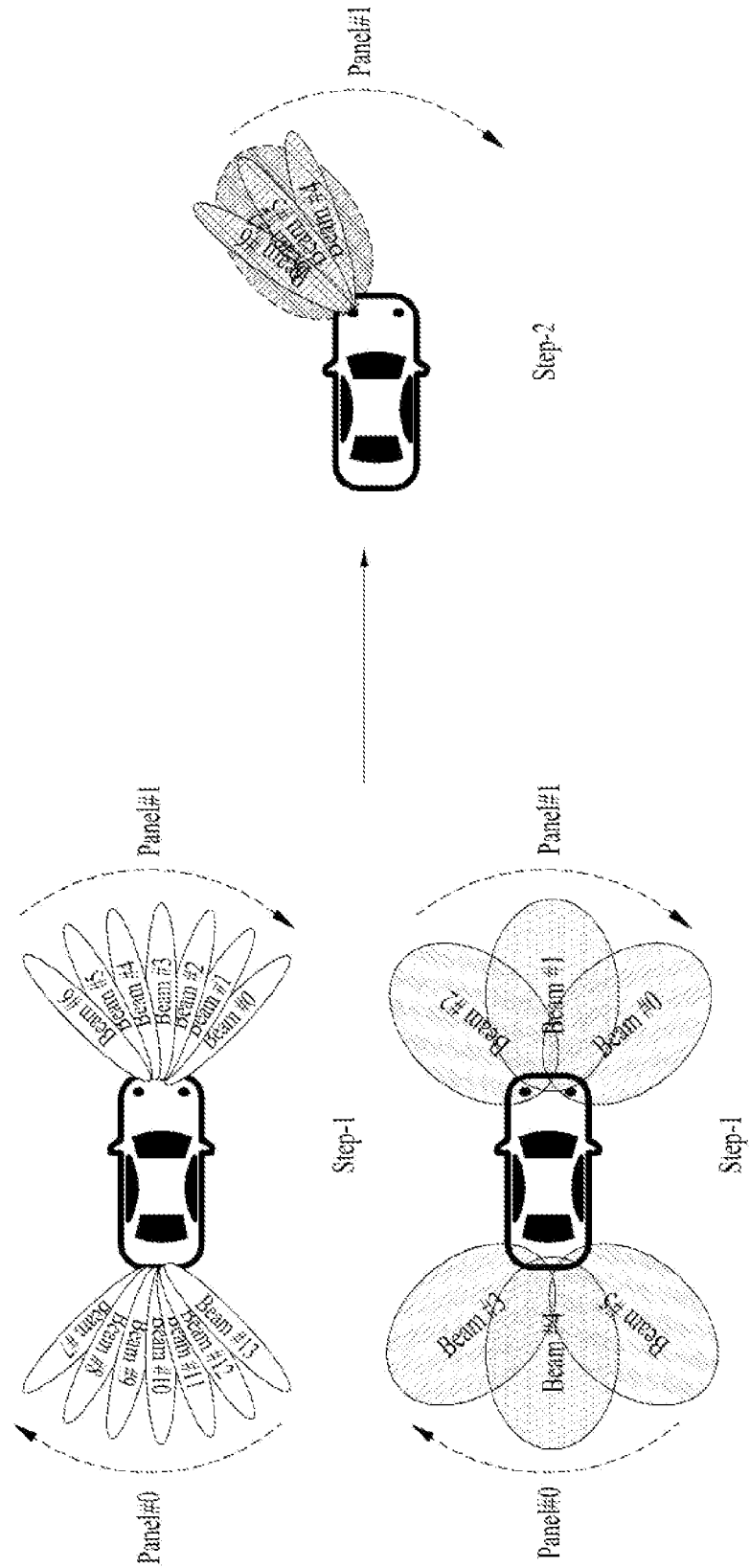
FIG. 13 is a diagram illustrating a method for performing a beam management operation by a UE including a distributed antenna.

FIG. 13 is a diagram illustrating a method for performing beam management by a UE including a distributed antenna.

Referring to FIG. 13, a UE or vehicle may include a distributed antenna. In this case, the UE may operate in the first step by performing panel/beam-group/(logical/physical) antenna port group selection, and may operate in the second step by performing beam sweeping between candidate beams configurable in the panel/beam-group/(logical/physical) antenna port group selected in the first step. In the beam measurement report of the first step, the UE may feed back the CSI-RS/S-SSB resource index having a good quality (RSRP, SNR, RSRQ and/or SINR, etc.) and/or the quality (RSRP, SNR, RSRQ and/or SINR, etc.) measured in the corresponding resources, or may feed back, to the counterpart UE or BS, the measured/calculated quality (RSRP, SNR, RSRQ and/or SINR, etc.) in the CSI-RS/S-SSB transmitted using either the selected panel/beam-group/(logical/physical) antenna port group index (or ID) and/or the selected panel/beam-group/(logical/physical) antenna port group.

In addition, an indicator (e.g., a 1-bit indicator) may be required to distinguish whether a UE-to-UE (or UE-to-BS) beam management operation corresponds to selection of a panel/beam-group/(logical/physical) antenna port group (or the first step for beam management or definition of the state (e.g., state 1 of FIG. 10) mapped to the first step for beam management, or corresponds to beam selection (or the second step for beam management or definition of the state (e.g., state 2 or 3 of FIG. 10) mapped to the second step for beam management) in the selected panel/beam-group/(logical/physical) antenna port group. The indicator can be transmitted through physical layer signaling or higher layer signaling.

Meanwhile, the beam width used for beam sweeping/measurement in the first step is the same as the beam width used for beam sweeping/measurement in the second step, a candidate beam for performing sweeping/measurement in the first step is more spatially distributed (widely, with a greater angular spread value) than a candidate beam for performing sweeping/measurement in the second step, and the number of candidate beams in the first step may be greater than the number of candidate beams in the second step.

As described above, each operation related to beam management of the UE may be defined as an individual state as shown in FIG. 10. In this case, the 2-step beam management operation described above can also be interpreted as a transition operation between states. For example, the Tx beam sweeping/measurement operation of the Tx UE can be interpreted as UE transition from State 1 to State 2, so that the first-step beam sweeping measurement can be interpreted as transition to the second step in the above-described beam management operation. Even if the beam management operation of the UE is mapped based on the state transition operation, the above-described proposed technology can be applied in the same manner. In other words, transition from state 1 to state 2 can be interpreted as transition from the first-step beam sweeping/measurement operation to the second-step beam sweeping/measurement operation in the above beam management operation.

In addition, although the present disclosure has been described centering around the 2-step beam management operation, the scope or spirit of the present disclosure is not limited thereto, and the above-described technology can also be equally applied to the other beam management operation including N steps (where N≥1).

Meanwhile, in implementation of a UE related to beam management, each UE may have a set of candidate beams called a beambook. When performing beam sweeping/measurement/selection, the UE may perform beam sweeping/measurement/selection for all/some candidate beams within a beambook thereof (i.e., defined from the factory release, or signaled or defined from the network/BS/counterpart UE), so that the UE can determine the actual transmit/receive (Tx/Rx) beams. Each UE may have at least one beambook, and each beambook may be configured to include a different/identical number of beams having different/identical beam widths. In this case, according to the following criteria, the UE may select at least one beambook including an appropriate candidate beam, and may operate to select a beam to be used for actual transmission/reception (Tx/Rx) within the selected at least one beambook.

Vehicle driving absolute/relative speed

Distance between transmitting and receiving UEs and/or (relative) driving direction Service type/requirements/priority (e.g., latency, reliability, required communication range)

Congestion level of transmission resource

Figure 14:
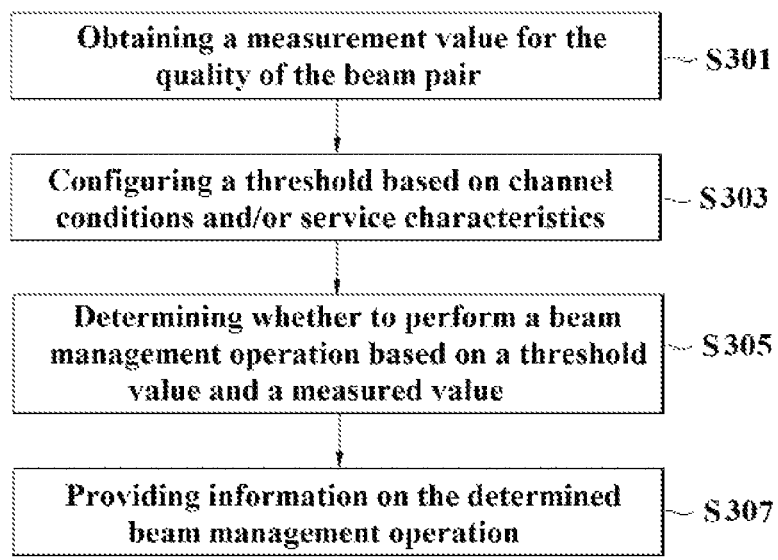
FIG. 14 is a diagram illustrating a method for performing a beam management operation based on at least one threshold value by a UE.

FIG. 14 is a diagram illustrating a method for performing beam management based on at least one threshold value by a first UE.

Referring to FIG. 14, a first UE may form a predetermined beam pair with a second UE to transmit a sidelink signal to a second UE through the predetermined beam pair, so that a measurement value obtained when the second UE measures the quality of a beam pair through which the sidelink signal is transmitted can be obtained or reported (S301).

Here, the above measurement value may be a measurement value of at least one of a Reference Signal Received Quality (RSRQ), a Signal to Interference Noise Ratio (SINR), a Signal to Noise Ratio (SNR), and a Reference Signal Received Power (RSRP) measured for the sidelink signal or a reference signal used for transmission and reception of the sidelink signal.

Next, the first UE may determine or configure at least one threshold value for determining performance of the beam management operation and/or for determining the beam management operation based on a channel state and characteristics of the service (S303). That is, the first UE may determine or configure the at least one threshold value by reflecting a channel state change and service characteristics. Here, the channel state change is for at least one of a movement speed of the first UE, a relative speed to the second UE, and a channel congestion level. The service characteristic may be for at least one of a service type, a service requirement, and/or a priority.

Specifically, the at least one threshold value may be determined based on a moving speed of the first UE, a relative speed to the second UE, or a congestion level of a channel. Alternatively, the at least one threshold value may be determined based on a service type, a requirement, and/or a priority, which are service characteristics of the sidelink signal. Alternatively, the at least one threshold may be determined based on the width of the transmission (Tx) beam, the number of transmission (Tx) beams, the width of the reception (Rx) beam, and the number of transmission (Tx) beams. In other words, the at least one threshold value can be changed or configured differently according to a change in the movement speed of the first UE, a relative speed to the second UE, or a congestion level of the channel, according to a change in service characteristics (service type, service requirements, and/or service priority) of the sidelink signal, and/or according to a change in the width of a Tx beam, the number of Tx beams, the width of an Rx beam, and the number of Rx beams.

That is, the first UE may change or configure the at least one threshold value in which the current channel state and service characteristics (or beam-pair sweeping and/or beam-pair reselection are triggered) are reflected, so that the number of times of the operation in which the beam-pair change operation is frequently performed according to a change in channel state or a change in service characteristics through the at least one threshold value (or a threshold value at which beam pair sweeping and/or beam reselection are triggered) can be minimized.

Next, the first UE may determine whether to perform a beam management operation related to the beam pair based on the measurement value and at least one threshold value (S305). For example, if the measurement value is less than the at least one threshold value, the first UE may decide to perform a beam management operation for changing the Tx beam and/or Rx beam forming the beam pair. In contrast, if the measurement value is equal to or higher than the at least one threshold value, the first UE can maintain the current beam pair without execution of the beam management operation.

Here, the first UE may classify a beam management operation related to the beam pair into a first beam management operation and a second beam management operation (i.e., two-step operation described above). Specifically, the first beam management operation is an operation for performing beam sweeping within a limited range depending on the beam direction of the current beam pair. Alternatively, the first beam management operation performs beam sweeping using adjacent transmission beams (or reception beams) within a limited range (or angular range) according to a spatial relationship that was pre-signaled based on the beam direction of the current beam pair, so that the range of beam sweeping is limited. The second beam management operation is an operation for performing beam sweeping without considering the beam direction of the current beam pair. Alternatively, the second beam management operation may be an operation for performing beam sweeping in all directions.

Specifically, the first UE may perform one of the first beam management operation and the second beam management operation based on the at least one threshold value and the measurement value. Meanwhile, the first beam management operation may be mapped to State 1, and the second beam management operation may be mapped to State 2 (or State 3).

The at least one threshold value may include a first threshold value and a second threshold value, and the first threshold value may be set to a value smaller than the second threshold value. In this case, when the measurement value is equal to or greater than the first threshold value and is less than the second threshold value, the first UE may perform the first beam management operation. Alternatively, when the measurement value is less than the first threshold value, the first UE may perform the second beam management operation.

Here, the first threshold value may correspond to RSRP_1 described with reference to FIG. 10, and the second threshold value may correspond to RSRP_2 or RSRP_3 described with reference to FIG. 10. On the other hand, the second threshold value may be greater than a value (RSRP_0 of FIG. 10) corresponding to a reference value at which beam failure recovery is performed. When the measurement value is less than the reference value, the first UE may perform a beam failure and recovery procedure (or RLF).

Next, the first UE may provide the second UE with information about which one of the first beam management operation and the second beam management operation will be used to perform the beam management operation (S307). As described above, the first UE may provide the second UE with information on a beam management operation scheduled to be performed through a first indicator or a 1-bit indicator. Here, the first indicator or the 1-bit indicator may discriminate between the first beam management operation and the state 1 mapped to the first beam management operation, and may discriminate between the second beam management operation and the state 2 (State 2) mapped to the second beam management operation. Alternatively, a format (or DCI format) of sidelink control information (SCI) corresponding to each of the first beam management operation and the second beam management operation may be interlocked in advance, and the first UE may provide the second UE with information about the SCI format corresponding to the beam management operation scheduled to be performed, thereby providing information about the beam management operation scheduled to be performed.

Furthermore, the at least one first candidate beam used in the first beam management operation may have a beam width smaller than the width of at least one second candidate beam used in the second beam management operation, a smaller number of beams than the number of the at least one second candidate beam may be used in the at least one first candidate beam, or the at least one first candidate beam may include beams each having a value less than an angular spread value of the at least one second candidate beam.

According to an embodiment, the first UE may classify the beam management operation related to the beam pair into a third beam management operation and a fourth beam management operation, and may then perform the third beam management operation and the fourth beam management operation separately from each other. The third beam management operation is a beam management operation for performing repeated transmission without changing the direction of the transmission (Tx) beam. The fourth beam management operation is a beam management operation for transmitting (or cycling of a different transmission beam) the Tx beam by changing the direction of the Tx beam. Meanwhile, the fourth beam management operation may also be divided into the first beam management operation and the second beam management operation as necessary.

In this case, the first UE may perform one of the third beam management operation and the fourth beam management operation based on the at least one threshold value and the measurement value. Meanwhile, the third beam management operation may be mapped to State 3 described above, and the fourth beam management operation may be mapped to State 2 (or State 1).

Specifically, the at least one threshold value may include the above-described second threshold value and a third threshold value, and the third threshold value may be set to a value greater than the second threshold value. Alternatively, the at least one threshold value may include the first threshold value, the second threshold value, and the third threshold value. The at least one threshold value may be arranged in ascending numerical order of the first threshold value→the second threshold value→the third threshold value. Alternatively, the first threshold value may be set to RSRP_1 in FIG. 10, the second threshold value may be set to RSRP_2 in FIG. 10, and the third threshold value may be set to o RSRP_3 in FIG. 10. Alternatively, the first threshold value may be RSRP_1 in FIG. 10, the second threshold may be RSRP_2 in FIG. 10, and the third threshold value may be RSRP_3 in FIG. 10.

In this case, the first UE may perform the third beam management operation when the measurement value is equal to or greater than the second threshold and less than the third threshold. Alternatively, if the measurement value is less than the second threshold value, the first UE may perform the fourth beam management operation. In addition, the first UE may provide the second UE about information about which one of the third beam management operation and the fourth beam management operation is to be performed. For example, the first UE may provide the second UE with information on whether to perform repeated transmission of a transmission beam (on/off) through a second indicator or a 1-bit indicator.

Alternatively, when the at least one threshold value includes a first threshold value, a second threshold value, and a third threshold value, the fourth beam management operation is subdivided into the first beam management operation and the second beam management operation described above. In this case, the first UE indicates whether the transmission (Tx) beam is repeatedly transmitted through the second indicator. When the first indicator indicates the OFF state of the repeated transmission of the transmission (Tx) beam, the first UE may instruct the second UE to determine whether beam sweeping is to be performed within a limited range through the first indicator.

According to another embodiment, the second UE may measure the quality of a sidelink signal or reference signal received from the first UE using the beam pair. In this case, the measurement value indicating the measured quality may be a value of at least one of RSRQ (Reference Signal Received Quality), SINR (Signal to Interference plus Noise Ratio), SNR (Signal to Noise Ratio), and RSRP (Reference Signal Received Power) for the sidelink signal or reference signal. The second UE may transmit or report the measured value to the first UE. The second UE may receive a signal responding to a report of the measurement value. The response signal may include information about whether the beam management operation is to be performed based on the measurement value and the at least one threshold value, and may include instruction information about which beam management operation is to be performed. For example, the beam management operation to be performed may be at least one of a first beam management operation, a second beam management operation, a third management operation, and a fourth management operation. Here, the at least one threshold value may include a first threshold value, a second threshold value, and a third threshold value, and may be determined based on a channel state and/or service characteristics as described above.

Alternatively, the second UE does not forcibly perform sweeping of the reception (Rx) beam corresponding to the first beam management operation and the second beam management operation, and may estimate and report the quality of the transmission (Tx) beam without changing the reception (Rx) beam according to UE capability or the like.

Alternatively, the second UE may directly determine a beam management operation to be performed based on the measurement value and the at least one threshold value. When the measurement value is reported to the first UE, the second UE may also provide the first UE with recommendation information indicating the determined beam management operation.

Since examples of the above-described various proposals may also be included as implementation methods of the present disclosure, it is obvious that they may be regarded as a kind of proposed methods. The present disclosure is not limited to direct communication between UEs, and may also be used in uplink or downlink communication, and at this time, a base station or a relay node can use the proposed method. Rules can be defined in a manner that information about whether the above-described proposed methods are applied (or information about the rules of the proposed methods) can be signaled from the BS to the UE or from the Tx UE to the Rx UE through pre-defined signaling (e.g., physical layer signaling or higher layer signaling).

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 15:
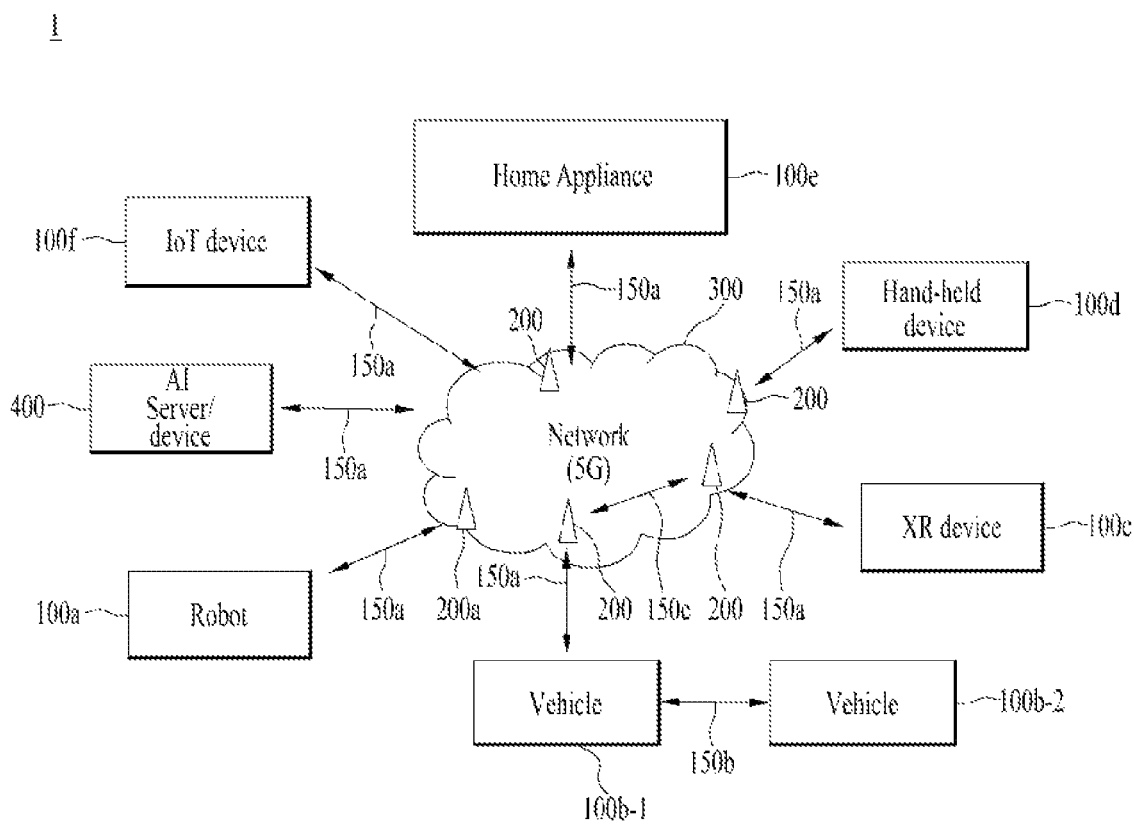
FIG. 15 illustrates a communication system applied to the present disclosure.

FIG. 15 illustrates a communication system applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 16:
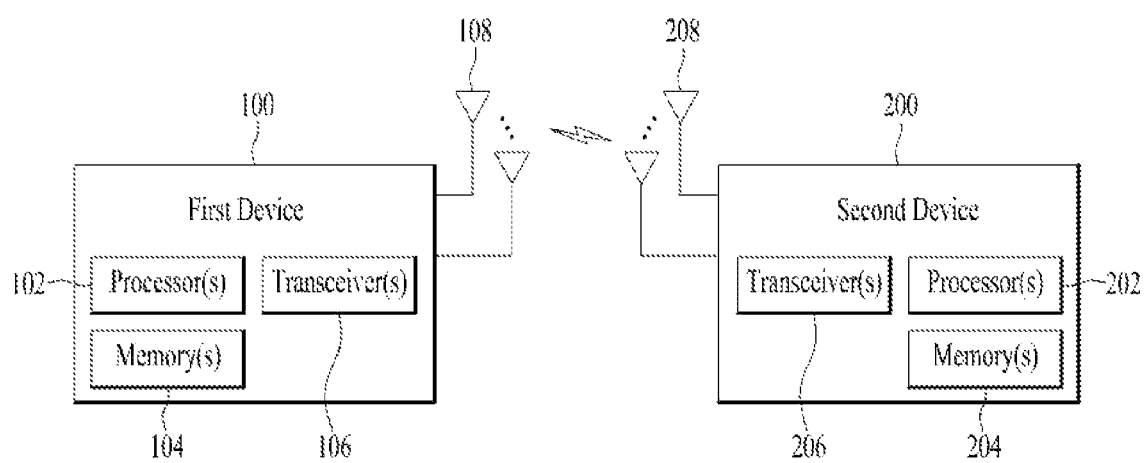
FIG. 16 illustrates wireless devices applicable to the present disclosure.

FIG. 16 illustrates a wireless device applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108.

Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include a processor 102 and a memory 104 that are connected to the RF transceiver. The memory 104 may include at least one program capable of performing the operation related to the embodiments shown in FIGS. 10 to 14.

The processor 102 may control the RF transceiver to obtain, from the second UE, a measurement value for the quality of a beam pair through which a sidelink signal is transmitted and received, and to determine whether a beam management operation for the beam pair is performed based on at least one threshold value and the measurement value. The processor 102 may determine whether to perform a beam management operation for the beam pair based on the at least one threshold value and the measurement value. Each of the at least one threshold value may be set based on at least one of mobility information of the first UE, a relative speed to the second UE, a channel congestion level, and service characteristics related to the sidelink signal. The processor 102 may perform the beam management operations described in FIGS. 10 to 14 based on a program included in the memory 104.

Alternatively, the chip set including the processor 102 and the memory 104 may be configured. In this case, the chip set may include at least one processor, and at least one memory operatively connected to the at least one processor and configured to store instructions such that the at least one processor performs specific operations by executing the instructions. The specific operations may include obtaining, from the second UE, a measurement value for the quality of a beam pair through which a sidelink signal is transmitted and received, determining whether a beam management operation for the beam pair is performed based on at least one threshold value and the measurement value, and determining whether to perform a beam management operation for the beam pair based on the at least one threshold value and the measurement value. Each of the at least one threshold value may be set based on at least one of mobility information of the first UE, a relative speed to the second UE, a channel congestion level, and service characteristics related to the sidelink signal. The above-described operations may include the beam management operations described with reference to FIGS. 10 to 14 based on the program included in the memory 104.

Alternatively, a computer-readable storage medium is configured to store at least one computer program including instructions such that at least one processor performs specific operations by executing the instructions. The specific operations may include obtaining, from the second UE, a measurement value for the quality of a beam pair through which a sidelink signal is transmitted and received, determining whether a beam management operation for the beam pair is performed based on at least one threshold value and the measurement value, and determining whether to perform a beam management operation for the beam pair based on the at least one threshold value and the measurement value. Each of the at least one threshold value may be set based on at least one of mobility information of the first UE, a relative speed to the second UE, a channel congestion level, and service characteristics related to the sidelink signal. The above-described operations may include the beam management operations described with reference to FIGS. 10 to 14 based on the program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 17:
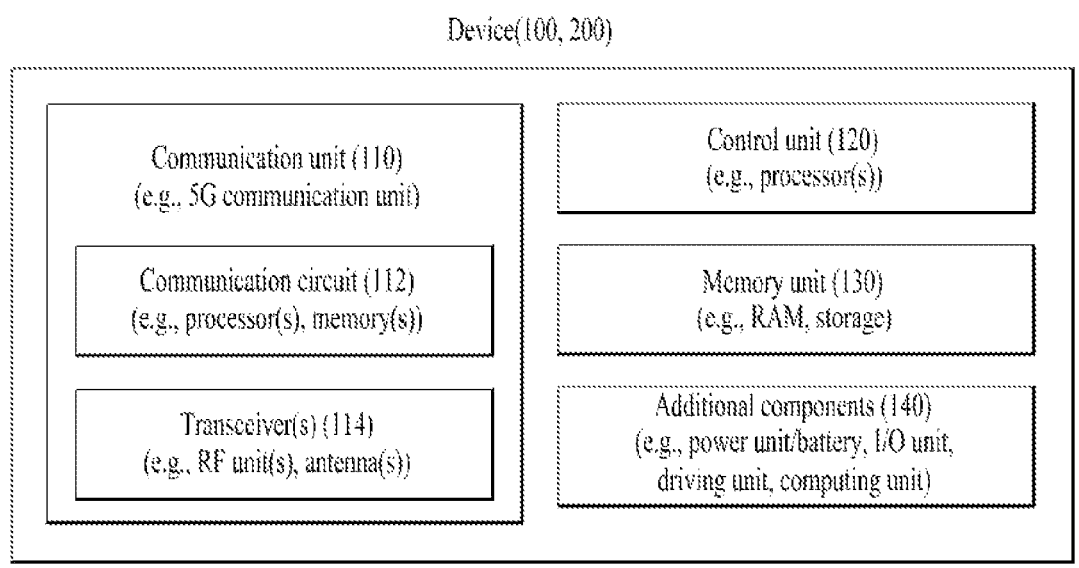
FIG. 17 illustrates another example of a wireless device to which the present disclosure is applied. The wireless device may be implemented in various forms according to use-examples/services.

FIG. 17 illustrates another example of a wireless device applied to the present disclosure. The wireless device may be implemented in various forms according to a use-case/service (refer to FIG. 15).

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 18:
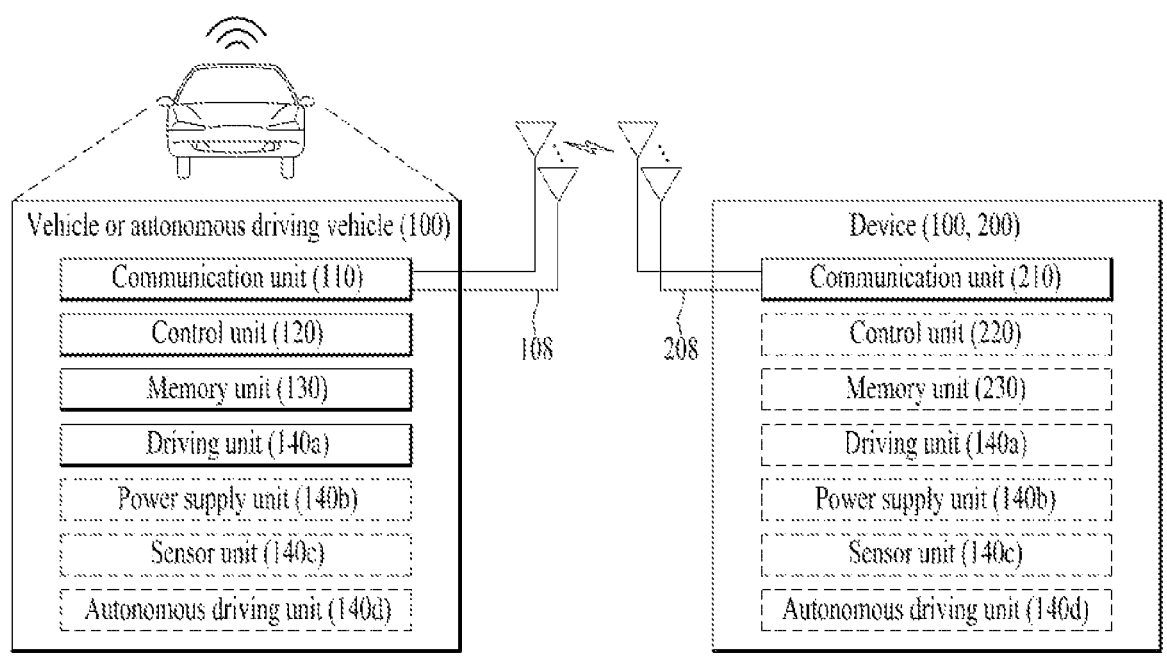
FIG. 18 illustrates a vehicle or an autonomous driving vehicle applied to the present disclosure.

Examples of Vehicles or Autonomous Vehicles to which the Present Disclosure is Applied FIG. 18 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for performing a beam management operation by a first user equipment (UE) in a wireless communication system supporting a direct communication between UEs comprising:
obtaining, from a second user equipment (UE), a measurement value for a quality of a beam pair which the direct communication between UEs is formed with the second UE; and
determining whether to perform a beam management operation for the beam pair based on at least one threshold value and the measurement value,
wherein each of the at least one threshold value is configured based on at least one of mobility information of the first UE, a relative speed to the second UE, a congestion level of a channel, and service characteristics related to the direct communication between UEs
wherein the beam management operation is performed based on the measurement value less than the at least one threshold value; and wherein the beam management operation includes a first beam management operation in which beam sweeping is performed in a limited range based on a beam direction of the beam pair, and a second beam management operation in which the beam sweeping is performed regardless of the beam direction of the beam pair.

2. The method according to claim 1, wherein:
the first UE is configured to trigger a reselection operation of transmission resources related to the direct communication between UEs based on a determination of performing the beam management operation.

3. The method according to claim 1, wherein:
the at least one threshold value includes a first threshold value and a second threshold value; and
the first UE performs the first beam management operation when the measurement value is equal to or greater than the first threshold value and less than the second threshold value, and performs the second beam management operation when the measurement value is less than the first threshold value.

4. The method according to claim 3, further comprising:
providing, to the second UE, operation information on the beam management operation to be performed.

5. The method according to claim 4, wherein:
the operation information is provided to the second UE through a format of direct communication between UEs control information (SCI) or a format of downlink control information (DCI).

6. The method according to claim 1, wherein:
the beam management operation is performed based on the measured value less than the at least one threshold value; and
the beam management operation includes
a third beam management operation for repeatedly transmitting a transmission beam in the same direction, and
a fourth beam management operation for transmitting a transmission beam in a plurality of directions.

7. The method according to claim 6, wherein:
the at least one threshold value includes a second threshold value and a third threshold value; and
the first UE performs the third beam management operation when the measurement value is equal to or greater than the second threshold value and less than the third threshold value, and performs the fourth beam management operation when the measurement value is less than the second threshold value.

8. The method according to claim 7, wherein:
the first UE provides information on the beam management operation to be performed to the second UE through an indicator indicating whether the transmission beam is repeatedly transmitted.

9. The method according to claim 1, wherein:
the at least one first candidate beam used in the first beam management operation has a beam width smaller than a width of at least one second candidate beam used in the second beam management operation,
the number of the at least one first candidate beam used in the first beam management operation is smaller than the number of the at least one second candidate beams, and
the at least one first candidate beam includes at least one beam having a value less than an angular spread value of the at least one second candidate beam.

10. The method according to claim 1, wherein:
the measurement value is at least one of a reference signal received quality (RSRQ), a signal to interference plus noise ratio (SINR), a signal-to-noise ratio (SNR), and a reference signal received power (RSRP).

11. A first user equipment (UE) for performing a beam management operation in a wireless communication system supporting a direct communication between UEs, the first UE comprising:
a radio frequency (RF) transceiver; and
a processor connected to the RF transceiver,
wherein the processor is configured to:
obtain, from a second user equipment (UE), a measurement value for a quality of a beam pair which the direct communication between UEs is formed with the second UE, under control of the RF transceiver, and
determine whether to perform a beam management operation for the beam pair based on at least one threshold value and the measurement value,
wherein each of the at least one threshold value is configured based on at least one of mobility information of the first UE, a relative speed to the second UE, a congestion level of a channel, and service characteristics related to the direct communication between UEs,
wherein the beam management operation is performed based on the measurement value less than the at least one threshold value; and
wherein the beam management operation includes a first beam management operation in which beam sweeping is performed in a limited range based on a beam direction of the beam pair, and a second beam management operation in which the beam sweeping is performed regardless of the beam direction of the beam pair.

12. A computer-readable storage medium configured to store at least one computer program including instructions such that at least one processor for use in a wireless communication system supporting a direct communication between UEs performs specific operations of performing a beam management operation by executing the instructions, the computer-readable storage medium comprising:
at least one computer program for allowing the at least one processor to perform a beam management operation; and
a computer-readable storage medium configured to store the at least one computer program,
wherein the specific operations include:
obtaining, from a second user equipment (UE), a measurement value for a quality of a beam pair which the direct communication between UEs is formed with the second UE, and
determining whether to perform a beam management operation for the beam pair based on at least one threshold value and the measurement value,
wherein each of the at least one threshold value is configured based on at least one of mobility information of a first UE, a relative speed to the second UE, a congestion level of a channel, and service characteristics related to the direct communication between UEs
wherein the beam management operation is performed based on the measurement value less than the at least one threshold value; and
wherein the beam management operation includes a first beam management operation in which beam sweeping is performed in a limited range based on a beam direction of the beam pair, and a second beam management operation in which the beam sweeping is performed regardless of the beam direction of the beam pair.

* * * * *